United States Patent
Zuraski, Jr. et al.

(10) Patent No.: US 6,446,189 B1
(45) Date of Patent: Sep. 3, 2002

(54) COMPUTER SYSTEM INCLUDING A NOVEL ADDRESS TRANSLATION MECHANISM

(75) Inventors: Gerald D. Zuraski, Jr., Austin, TX (US); Frederick D. Weber, San Jose; William A. Hughes, Burlingame, both of CA (US); William K. Lewchuk, Austin, TX (US); Scott A. White, Austin, TX (US); Michael T. Clark, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/323,321

(22) Filed: Jun. 1, 1999

(51) Int. Cl.$^7$ ............................ G06F 12/00; G06F 12/10
(52) U.S. Cl. ............................ 711/207; 711/209; 710/49
(58) Field of Search .............................. 711/203–209, 3; 710/49

(56) References Cited

U.S. PATENT DOCUMENTS

| | | | |
|---|---|---|---|
| 4,669,043 A | 5/1987 | Kaplinsky | 711/3 |
| 4,700,291 A | 10/1987 | Saito | 711/207 |
| 5,060,137 A | 10/1991 | Bryg et al. | 711/205 |
| 5,491,806 A * | 2/1996 | Horstmann et al. | 711/207 |
| 5,564,052 A * | 10/1996 | Nguyen et al. | 365/49 |
| 5,623,619 A | 4/1997 | Witt | 711/3 |
| 5,671,444 A | 9/1997 | Akkary et al. | |
| 5,680,572 A | 10/1997 | Akkary et al. | |
| 5,751,996 A | 5/1998 | Glew et al. | 711/145 |
| 5,752,274 A | 5/1998 | Garibay, Jr. et al. | 711/206 |
| 5,761,691 A | 6/1998 | Witt | 711/3 |
| 5,895,501 A | 4/1999 | Smith | |
| 5,924,125 A | 7/1999 | Arya | 711/205 |
| 5,963,984 A * | 10/1999 | Garibay et al. | 711/202 |
| 6,038,661 A * | 3/2000 | Yoshioka et al. | 710/269 |
| 6,079,003 A * | 6/2000 | Witt et al. | 711/200 |
| 6,189,074 B1 | 2/2001 | Pedneau | |
| 6,226,732 B1 * | 5/2001 | Pei et al. | 711/207 |
| 6,233,652 B1 * | 5/2001 | Mathews et al. | 365/202 |
| 6,304,944 B1 | 10/2001 | Pedneau | |

FOREIGN PATENT DOCUMENTS

GB 2 210 479 6/1989

OTHER PUBLICATIONS

*Pentium Pro Family Developer's Manual, vol. 3: Operating System Writer's Manual*, Intel, 1996, pp. 11–13 thru 11–26.
Patterson et al., *Computer Architecture: A Quantitative Approach*, Morgan Kaufmann Publishers, 1990, pp. 437–438.

* cited by examiner

Primary Examiner—Matthew Kim
Assistant Examiner—Matthew D. Anderson
(74) Attorney, Agent, or Firm—Conley, Rose & Tayon, PC; Lawrence J. Merkel

(57) ABSTRACT

A processor is presented including a cache unit coupled to a bus interface unit (BIU). Address signal selection and masking functions are performed by circuitry within the BIU rather than within the cache unit, and physical addresses produced by the BIU are stored within the TLB. As a result, address signal selection and masking circuitry (e.g., a multiplexer and gating logic) are eliminated from a critical speed path within the cache unit, allowing the operational speed of the cache unit to be increased. The cache unit stores data items, and produces a data item corresponding to a received linear address. A translation lookaside buffer (TLB) within the cache unit stores multiple linear addresses and corresponding physical addresses. When a physical address corresponding to the received linear address is not found within the TLB, the cache unit passes the linear address to the BIU. The BIU includes address translation circuitry, a multiplexer, and gating logic, and returns the physical address corresponding to the linear address to the cache unit. The cache unit stores the physical address and the linear address within the TLB. The processor may also include a programmable control register and a microexecution unit. Upon detecting a change in state of an external masking signal, the microexecution unit may flush the contents of the TLB and modify a masking bit within the control register to reflect a new state of the masking signal.

24 Claims, 5 Drawing Sheets

COMPUTER SYSTEM INCLUDING A NOVEL ADDRESS TRANSLATION MECHANISM

BACKGROUND OF THE INVENTION

1. Field of the Invention

This invention relates to processors and computer systems, and more particularly to address translation mechanisms used within computer systems and processors.

2. Description of the Related Art

A typical computer system includes a processor which reads and executes instructions of software programs stored within a memory system. In order to maximize the performance of the processor, the memory system must supply the instructions to the processor such that the processor never waits for needed instructions. There are many different types of memory from which the memory system may be formed, and the cost associated with each type of memory is typically directly proportional to the speed of the memory. Most modern computer systems employ multiple types of memory. Smaller amounts of faster (and more expensive) memory are positioned closer to the processor, and larger amounts of slower (and less expensive) memory are positioned farther from the processor. By keeping the smaller amounts of faster memory filled with instructions (and data) needed by the processor, the speed of the memory system approaches that of the faster memory, while the cost of the memory system approaches that of the less expensive memory.

Most modern computer systems also employ a memory management technique called "virtual" memory which allocates memory to software programs upon request. This automatic memory allocation effectively hides the memory hierarchy described above, making the many different types of memory within a typical memory system (e.g., random access memory, magnetic hard disk storage, etc.) appear as one large memory. Virtual memory also provides for isolation between different programs by allocating different physical memory locations to different programs running concurrently.

Early x86 (e.g., 8086/88) processors used a segmented addressing scheme in which a 16-bit segment value is combined with a 16-bit offset value to form a 20-bit physical address. In a shift-and-add operation, the 16-bit segment portion of the address is first shifted left four bit positions to form a segment base address. The 16-bit offset portion is then added to the segment base address, producing the 20-bit physical address. In the early x86 processors, when the shift-and-add operation resulted in a physical address having a value greater than FFFFFh, the physical address value "wrapped around" and started at 00000h. Programmers developing software for the early x86 processors began to rely upon this address wrap-around "feature". In order to facilitate software compatibility, later x86 processors included an address bit 20 "masking" feature controlled by an "A20M" input pin. By asserting an A20M signal coupled to the A20M pin, address bit 20 is produced having a logic value of "0". As a result, address values greater than FFFFFh appear to wrap around and start at 00000h, emulating the behavior of the early x86 processors.

Many modern processors, including x86 processors, support a form of virtual memory called "paging". Paging divides a physical address space, defined by the number of address signals generated by the processor, into fixed-sized blocks of contiguous memory called "pages". If paging is enabled, a "virtual" address is translated or "mapped" to a physical address. For example, in an x86 processor with paging enabled, a paging unit within the processor translates a "linear" address produced by a segmentation unit to a physical address. If an accessed page is not located within the main memory unit, paging support constructs (e.g., operating system software) load the accessed page from secondary memory (e.g., magnetic disk) into main memory. In x86 processors, two different tables stored within the main memory unit, namely a page directory and a page table, are used to store information needed by the paging unit to perform the linear-to-physical address translations.

Accesses to the main memory unit require relatively large amounts of time. In order to reduce the number of required main memory unit accesses to retrieve information from the page directory and page table, a small cache memory system called a translation lookaside buffer (TLB) is typically used to store the most recently used address translations. As the amount of time required to access an address translation in the TLB is relatively small, overall processor performance is increased as needed address translations are often found in the readily accessible TLB.

A typical modem processor includes a cache memory unit coupled between an execution unit and a bus interface unit. The execution unit executes software instructions. The cache memory unit includes a relatively small amount of memory which can be accessed very quickly. The cache memory unit is used to store instructions and data (i.e. data items) recently used by the execution unit, along with data items which have a high probability of being needed by the execution unit in the near future. Searched first, the cache memory unit makes needed information readily available to the execution unit. When needed information is not found in the cache memory unit, the bus interface unit is used to fetch the needed information from a main memory unit located external to the processor. The overall performance of the processor is improved when needed information is often found within the cache memory unit, eliminating the need for time-consuming accesses to the main memory unit.

FIG. 1 is a block diagram illustrating an address translation mechanism of an exemplary modem x86 computer system. A cache unit 10 within an x86 processor may be used to store instructions and/or data (i.e., data items) recently used or likely to be needed by an execution unit coupled to cache unit 10. Cache unit 10 includes a TLB 12 used to store the most recently used address translations, a multiplexer 14, and gating logic 16.

TLB 12 receives a linear address provided to cache unit 10 and produces a stored physical address corresponding to the linear address. Multiplexer 14 receives the linear address provided to cache unit 10 and the physical address produced by TLB 12. Multiplexer 14 produces either the physical address or the linear address dependent upon a PAGING signal. When paging is disabled, the linear address provided to cache unit 10 is a physical address, and address translation by TLB 12 is unnecessary. In this case, the PAGING signal is deasserted, and multiplexer 14 produces the linear address. When paging is enabled, the linear address provided to cache unit 10 is a virtual address, and translation of the virtual address to a physical address is necessary. In this case, the PAGING signal is asserted, and multiplexer 14 produces the physical address produced by TLB 12. If a stored physical address corresponding to the linear address is found within TLB 12, TLB 12 asserts a TLB HIT signal. Otherwise, the TLB hit signal is deasserted.

Gating logic 16 receives address bit 20 (i.e., signal A20) of the physical address produced by multiplexer 14, and the A20M signal. Gating logic 16 produces a new signal A20 dependent upon the A20M signal. When the A20M signal is deasserted, gating logic produces the new signal A20 such that the new signal A20 has the same value as the signal A20 of the physical address produced by multiplexer 14. In other words, when signal A20M is deasserted, gating logic "passes" the signal A20 of the physical address produced by multiplexer 14. On the other hand, when the A20M signal is asserted, gating logic produces the new signal A20 with a logic value of "0". In other words, when signal A20M is asserted, gating logic "masks" or "clears" the signal A20 of the physical address produced by multiplexer 14.

In addition to TLB 12, cache unit 10 includes a cache memory 18 for storing the data items recently used or likely to be needed by the execution unit coupled to cache unit 10. Cache memory 14 includes a tag array 20 for storing physical address "tags", and a data array 22 for storing the data items. Each data item stored in data array 22 has a corresponding physical address "tag" stored in tag array 20.

When the linear address is provided to TLB 12, a least-significant or lower ordered "index" portion of the linear address is simultaneously provided to tag array 20 and data array 22 of cache memory 18. In the embodiment of FIG. 1, cache memory 18 is a two-way set associative cache structure. The index portion of the linear address is used as an index into tag array 20. As a result, tag array 20 produces two physical address "tags". One of the two physical address "tags" is provided to a comparator (CO) 24a, and the other physical address "tag" is provided to a comparator 24b. The index portion of the linear address is also used as an index into data array 22. As a result, data array 22 produces two data items. The two data items are provided to different inputs of a multiplexor (MUX) 26.

After passing through multiplexer 14 and gating logic 16, the physical address is provided to comparators 24a –b. If the physical address matches one of the physical address "tags" provided by tag array 20, the corresponding comparator 24 asserts an output signal. The output signals produced by comparators 24a–b are provided to a control unit 28 which controls the operations of cache unit 10. The output signal produced by comparator 24b is also provided to a control input of multiplexor 26. Multiplexer 26 produces an output DATA signal in response to the output signal produced by comparator 24b. The output DATA signal may include the data item from data array 22 corresponding to the physical address "tag" which matches the physical address provided to comparators 24a–b. Control unit 82 uses the TLB HIT signal and the output signals produced by comparators 24a–b to determine when the DATA signal produced by multiplexer 80 is "valid". When the DATA signal produced by multiplexer 80 is valid, control unit 82 asserts an output DATA VALID signal. Control unit 82 also produces an output CACHE HIT signal which is asserted when the data item corresponding to the provided linear address was found in cache memory 18.

Cache unit 10 is coupled to a bus interface unit (BIU) 30 within the x86 processor, and BIU 30 is coupled to a main memory 32 located external to the x86 processor. When the PAGING signal is asserted and TLB 12 does not contain the physical address corresponding to the linear address (i.e., the TLB HIT signal is deasserted), control unit 28 provides the linear address (i.e., virtual address) to BIU 30. BIU 30 may include address translation circuitry to perform the virtual-to-physical address translation. The address translation circuitry within BIU 30 may access virtual memory system information (e.g., the page directory and the page table) stored within main memory 32 in order to perform the virtual-to-physical address translation. BIU 30 may provide the resulting physical address to control unit 28, and control unit 28 may provide the physical address to TLB 12. TLB 12 may store the linear address (i.e., virtual address) and corresponding physical address, assert the TLB HIT signal, and provide the physical address to comparators 24a–b.

If the physical address does not match one of the physical address "tags" provided by tag array 20, control unit 28 may submit a read request to BIU 30, providing the physical address to BIU 30. BIU 30 may then read the data item from main memory 32, and forward the data item directly to cache memory 18 as indicated in FIG. 1. Cache memory 18 may store the physical address within tag array 20, and store the corresponding data item retrieved from main memory 32 within data array 22. Cache memory 18 may also forward the stored physical address to either comparator 24a or 24b, and forward the stored data item to an input of multiplexor 26. As a result, the comparator to which the stored physical address is provided asserts the output signal, multiplexor 26 produces the DATA signal including the stored data item, and control unit 28 asserts the CACHE HIT signal.

Multiplexer 14 and gating logic 16 exist along a critical speed path within cache unit 10, and thus limit the maximum speed at which cache unit 10 may operate. It would thus be desirable to have a processor including a cache unit which does not include multiplexer 14 and gating logic 16 coupled as shown in FIG. 1 such that the operational speed of the cache unit may be increased.

SUMMARY OF THE INVENTION

The problems outlined above are in large part solved by a computer system implementing a novel address translation mechanism. The computer system includes a processor which executes instructions. The present processor includes a cache unit coupled to a bus interface unit (BIU). Address signal selection and masking functions are performed by circuitry within the BIU rather than within the cache unit, and physical addresses produced by the BIU are stored within the TLB. As a result, address signal selection and masking circuitry (e.g., a multiplexer and gating logic) are eliminated from a critical speed path within the cache unit, allowing the operational speed of the cache unit of the present processor to be increased.

The cache unit stores data items, and produces a data item corresponding to a received linear address. The cache unit includes a translation lookaside buffer (TLB) for storing multiple linear addresses and corresponding physical addresses. When a physical address corresponding to the received linear address is not found within the TLB, the cache unit passes the linear address to the BIU. The BIU returns the physical address corresponding to the linear address to the cache unit. The linear address includes multiple linear address signals, and the physical address includes multiple physical address signals.

The BIU includes address translation circuitry, a multiplexer, and gating logic. The address translation circuitry receives the multiple linear address signals and produces multiple physical address signals from the multiple linear address signals. The multiplexer receives the multiple linear and physical address signals and a paging signal, wherein the paging signal may be asserted when a paged addressing mode is enabled. When the paging signal is deasserted, the multiplexer may produce the linear address signals as physical address signals at an output. On the other hand, the multiplexer may produce the multiple physical address signals at the output when the paging signal is asserted.

The gating logic receives one or more of the physical address signals produced by the multiplexer. The gating logic either passes the one or more physical address signals or masks the one or more physical address signals dependent upon a first masking signal. When the first masking signal is deasserted, the gating logic may produce the one or more physical address signals unchanged at an output. On the other hand, the gating logic may produce constant logic value signals (e.g., logic "0" signals) in place of the one or more physical address signals at the output when the first masking signal is asserted, thus masking the one or more physical address signals when the first masking signal is asserted. The BIU may provide the physical address signals acted upon by the gating logic to the cache unit as the physical address corresponding to the linear address. The cache unit may store the physical address and the linear address within the TLB.

The present processor may also include a microexecution unit and a programmable control register. The control register may include a masking bit and a paging bit. The first masking signal may be a value of the masking bit, and the paging signal may be a value of the paging bit. The microexecution unit may receive a second masking signal generated external to the processor. Upon detecting a change in state of the second masking signal from an old state to a new state (e.g., a transition from a logic low or "0" voltage level to a logic high or "1" voltage level), the microexecution unit may: (i) flush the contents of the TLB, and (ii) modify the value of the masking bit within the control register to reflect the new state of the second masking signal. Such actions may be delayed after detecting the change in state of the second masking signal to allow a certain number of instructions (e.g., 2) to be executed in the context of the old state of the second masking signal before the masking bit within the control register is changed.

The BIU may receive the paging signal (i.e., the value of the paging bit) from the control register. As described above, the paging signal may be asserted when the paged addressing mode is enabled. When the paging signal is asserted, the multiple linear address signals may form a virtual address. The address translation circuitry within the BIU may produce the multiple physical address signals from the multiple linear address signals when the paging signal is asserted. In other words, the address translation circuitry may perform a virtual-to-physical address translation when the paging signal is asserted.

The BIU may be coupled to a main memory located external to the processor. The main memory may be used to store virtual memory system information (e.g., a page directory and a page table). The address translation circuitry may use the virtual memory system information stored within the main memory to produce the multiple physical address signals.

The present processor implements a novel address translation method. This method may include providing a translation lookaside buffer (TLB) for storing multiple linear addresses and corresponding physical addresses. Upon detecting a change in state of a masking signal (e.g., the externally generated second masking signal described above) from the old state to the new state, the TLB may be flushed, and the new state of the masking signal may be saved. When a linear address is not found within the TLB, a physical address including multiple physical address signals may be produced from the linear address. One or more of the physical address signals may be masked dependent upon the saved state of the second masking signal. The linear address and the physical address may then be saved within the TLB.

A computer system is described which includes the present processor. The computer system may also include a bus coupled to the processor, and a peripheral device coupled to the bus. The bus may be a peripheral component interconnect (PCI) bus, and the peripheral device may be, for example, a network interface card, a video accelerator, an audio card, a hard disk drive, or a floppy disk drive. Alternately, the bus may be an extended industry standard architecture (EISA)/industry standard architecture (ISA) bus, and the peripheral device may be, for example, a modem, a sound card, or a data acquisition card.

BRIEF DESCRIPTION OF THE DRAWINGS

Other objects and advantages of the invention will become apparent upon reading the following detailed description and upon reference to the accompanying drawings in which.

Figure 1:
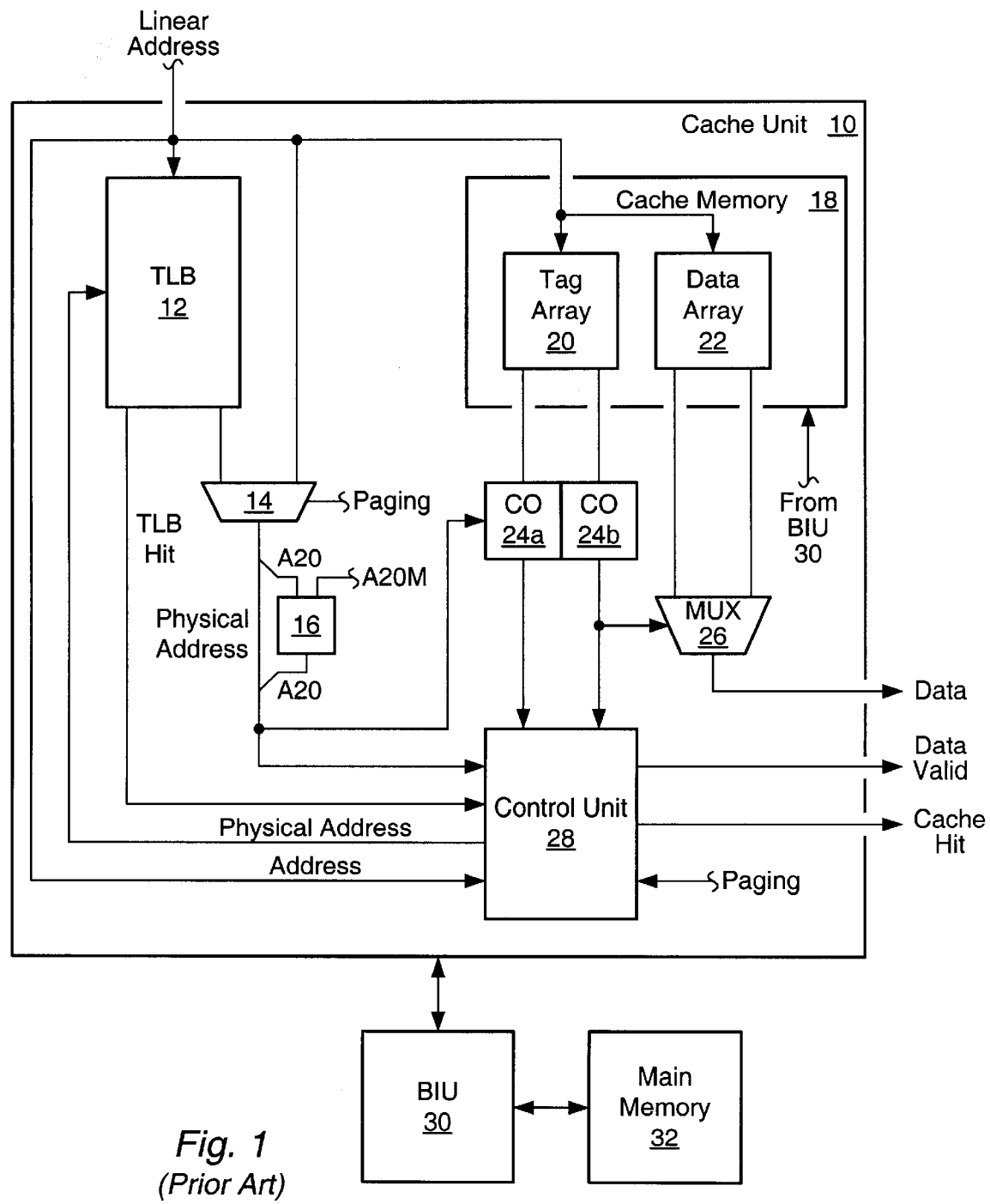
FIG. 1 is a block diagram illustrating an address translation mechanism of an exemplary modern x86 computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
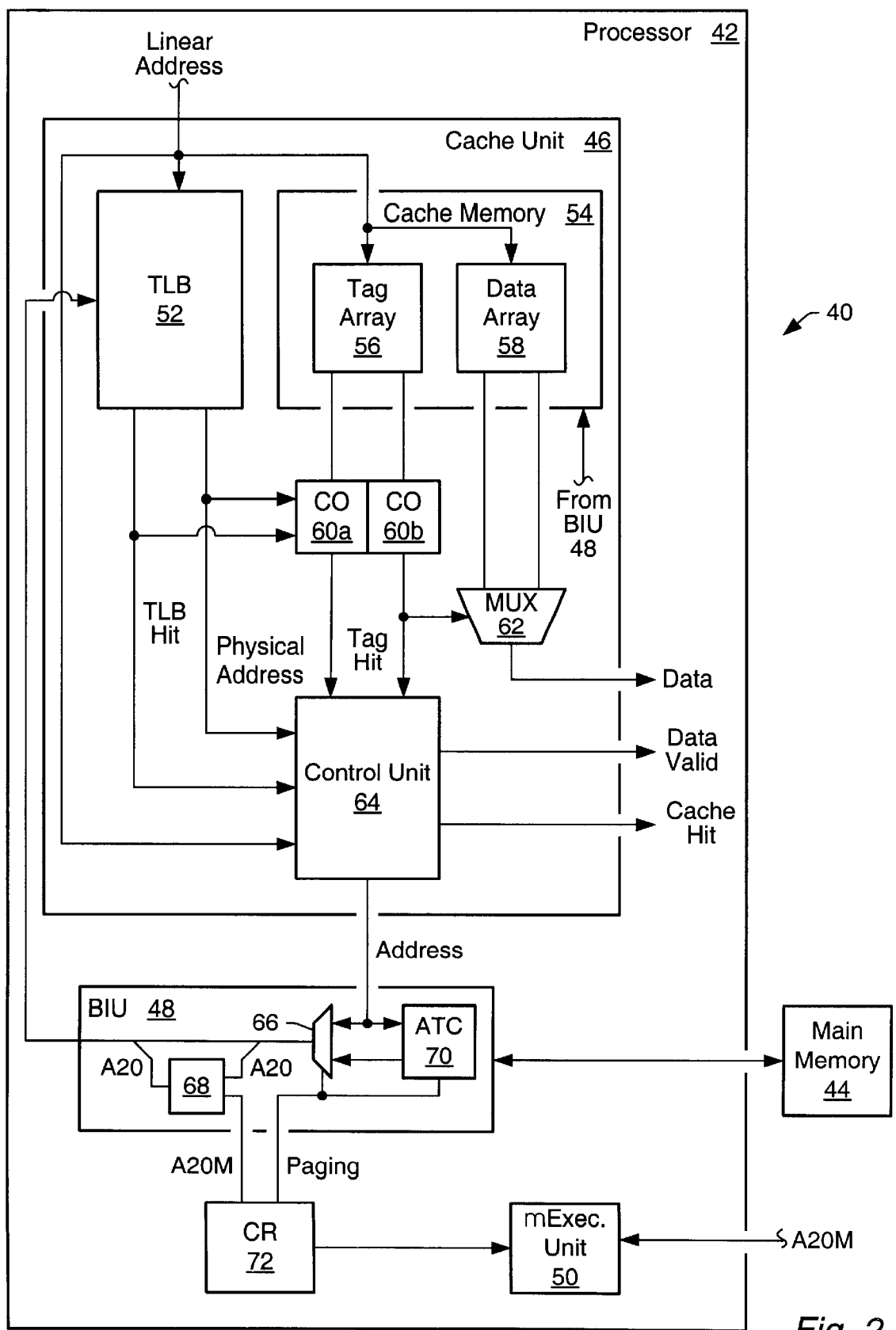
FIG. 2 is a block diagram of a computer system including an address translation mechanism in accordance with the present invention.

FIG. 2 is a block diagram of a computer system 40 including an address translation mechanism in accordance with the present invention. Computer system 40 includes a processor 42 coupled to a main memory 44. Processor 42 is configured to execute instructions (e.g., x86 instructions). Main memory 44 is configured to store data items including instructions.

Processor 42 includes a cache unit 46 coupled to a bus interface unit (BIU) 48, and a microexecution unit 50. Cache unit 46 may be used to store instructions or data recently used or likely to be needed by an execution unit coupled to cache unit 46. BIU 48 is used to transfer data between processor 42 and devices connected to a bus external to processor 42. For example, main memory 44 may be coupled to the bus, and BIU 48 may handle data transfers between processor 42 and main memory 44.

Cache unit 46 includes a translation lookaside buffer (TLB) 52 used to store the most recently used address translations. TLB 52 may be a fully associative TLB including, for example, 32 entry locations for storing linearto-physical (i.e., virtual-to-physical) address translations. TLB 52 receives a linear address provided to cache unit 46 (e.g., by the execution unit) and produces a stored physical address corresponding to the linear address. When a stored physical address corresponding to the linear address is found within TLB 52, TLB 52 asserts a TLB HIT signal. Otherwise, the TLB HIT signal is deasserted.

Cache unit 46 also includes a cache memory 54 for storing the data items recently used or likely to be needed by the execution unit. Cache memory 54 includes a tag array 56 for storing the physical address "tags",and a data array 58 for storing the data items. Each data item stored in data array 58 has a corresponding physical address "tag" stored in tag array 56.

When the linear address is provided to TLB 52, a least-significant or lower ordered "index" portion of the linear address is simultaneously provided to tag array 56 and data array 58 of cache memory 54. In the embodiment of FIG. 2, cache memory 54 is a two way set associative structure. The index portion of the linear address is used as an index into tag array 56. As a result, tag array 56 produces two physical address "tags". One of the two physical address "tags" is provided to a comparator (CO) 60a, and other physical address tag is provided to a comparator (CO) 60b. The index portion of the linear address is also used as an index into data array 58. As a result, data array 58 produces two data items. The two data items are provided to different inputs of a multiplexer 62.

Rather than using multiplexer 14 to bypass TLB 12 when paging is enabled as shown in FIG. 1, TLB 52 of FIG. 2 is used to provide the physical address when paging is both enabled and disabled. As will be described in detail below, the physical address stored within TLB 52 accounts for the state of the A20M signal described above. As a result, multiplexer 14 and gating logic 16 of FIG. 1 are eliminated from the speed-sensitive physical address input paths to comparators 60a–b of FIG. 2.

If the physical address produced by TLB 52 matches one of the physical address "tags" provided by tag array 56, the corresponding comparator 60 produces an asserted TAG HIT signal. The TAG HIT signals are provided to a control unit 64 which controls the operations of cache unit 46. One of the TAG HIT signals is also provided to a control input of multiplexer 62. In FIG. 2, the TAG HIT signal produced by comparator 60b is provided to the control input of multiplexer 62. multiplexer 62 produces the data corresponding to address tag provided to comparator 60b if the TAG HIT signal is asserted, and produces the data corresponding to address tag provided to comparator 60a if the TAG HIT signal is deasserted. Control unit 64 produces a DATA VALID signal and a CACHE HIT signal dependent upon the TLB HIT signal and the TAG HIT signals. When the data provided by multiplexer 62 is valid, control unit 64 asserts the DATA VALID signal. Control unit 64 asserts the CACHE HIT signal when the data item corresponding to the provided linear address was found within cache memory 54.

In the embodiment of FIG. 2, processor 42 includes a programmable control register (CR) 72. Control register 72 stores multiple control bits which determine the functions of various elements of processor 42. Control register 72 includes a PAGING bit and an A20M bit. The value of the PAGING bit is dependent upon whether paging is enabled. For example, when paging is disabled, the PAGING bit may be a logic "0",and the PAGING bit may be a logic "1" when paging is enabled. The value of the A20M bit is dependent upon whether address bit 20 (A20) of the address signal is to be masked (i.e., cleared). For example, when A20 is not to be masked, the A20M bit may be a logic "1",and the A20M bit may be a logic "0" when A20 is to be masked.

Microexecution unit 50 executes stored instructions called microinstructions. Microexecution unit 50 receives the external A20M signal, e.g., from hardware coupled to processor 42. In x86 processors, such hardware coupled to processor 42 is often triggered to assert the A20M signal when processor 42 executes an x86 "OUT" instruction. Execution of the "OUT" instruction by processor 42 causes processor 42 to write a value to a selected address (e.g., port "92h") during an I/O bus cycle. The hardware coupled to processor 42 may be configured to detect the writing of the value to the selected address during an I/O bus cycle and to assert the A20M signal in response.

Any sampled edge transition of the received A20M signal produces a microinterrupt within microexecution unit 50. The microinterrupt causes microexecution unit 50 to suspend execution of a microinstruction stream and to execute instructions of a microinterrupt handler. The instructions of the microinterrupt handler cause microexecution unit 50 to clear or "flush" the contents of TLB 52 and to change the state of the A20M bit in control register 72. The flushing of TLB 52 clears out "stale" address mappings stored in the context of the old state of the A20M pin of control register 72. After executing the instructions of the microinterrupt handler, microcontroller 50 resumes execution of the microinstruction stream. As TLB 52 will contain no valid address mappings after being flushed, the instruction executed by processor 42 following the flushing of TLB 52 will "miss" in TLB 52. As a result, control unit 64 will request an address mapping from BIU 48. BIU 48 will return an address mapping in the context of the new state of the A20M pin of control register 72.

When TLB 52 does not contain the physical address corresponding to the linear address, control unit 64 provides the linear address to BIU 48. BIU 48 includes a multiplexer 66, gating logic 68, and address translation circuitry (ATC) 70. ATC 70 is used to perform virtual-to-physical address translation when paging is enabled. ATC 70 may perform the virtual to physical address translation by accessing virtual memory system information (e.g. the page directory and the page table) stored within main memory 44.

Multiplexer 66 receives the linear address provided by control unit 64 and the physical address produced by ATC 70 at data inputs, and the value of the PAGING bit of control register 72 at a control input. Multiplexer 66 produces either the physical address or the linear address dependent upon the value of the PAGING bit. When paging is disabled, the linear address is a physical address as described above, and address translation by ATC 70 is unnecessary. In this case, the PAGING bit is inactive, and multiplexer 66 produces the linear address. When paging is enabled, the linear address is a virtual address as described above, and translation of the virtual address to a physical address by ATC 70 is necessary. In this case, the PAGING bit is active, and multiplexer 66 produces the physical address produced by ATC 70.

Gating logic 68 receives address bit 20 (i.e., signal A20) of the physical address produced by multiplexer 66, and the value of the A20M bit of control register 72. Gating logic 68 produces a new signal A20 dependent upon the value of the A20M bit. When the A20M bit is inactive, gating logic 68 produces the new signal A20 such that the new signal A20 has the same value as the signal A20 of the physical address produced by multiplexer 66. In other words, when the A20M bit is inactive, gating logic "passes" the signal A20 of the physical address produced by multiplexer 66. On the other hand, when the A20M bit is active, gating logic produces the new signal A20 with a logic value of "0". In other words, when the A20M bit is active, gating logic "masks" or "clears" the signal A20 of the physical address produced by multiplexer 66.

After passing through multiplexer 66 and gating logic 68, the physical address produced by BIU 48 is provided to TLB 52. TLB 52 stores the linear address and corresponding physical address, asserts the TLB HIT signal and provides the physical address to the comparators 60a–b.

If the physical address does not match on of the physical address "tags" provided by the tag array, control unit 64 may submit a read request to BIU 48, providing the physical address to BIU 48. BIU 48 may then read the data item from main memory 44 and forward the data item directly to cache memory 54 as indicated in FIG. 2. Cache memory 54 may store the physical address within tag array 56, and store the corresponding data item retrieved from main memory 44 within data array 58. Cache memory 54 may also forward the stored physical address to an input of comparator 60a or 60b, and may forward the data item to an input of multiplexer 62. As a result, the comparator 60 to which the stored physical address is forwarded may assert the TAG HIT output signal, multiplexer 62 may produce the data item, and control unit 64 may assert the DATA VALID and CACHE HIT signals.

The external A20M signal received by microexecution unit 50 may be active low, meaning that the signal is asserted when the signal voltage is low, and is deasserted when the signal voltage is high. In this case, a transition in the signal voltage of the received A20M signal from high to low causes a microinterrupt within microexecution unit 50. During handling of the microinterrupt, microexecution unit 50 samples the low voltage level of the A20M signal and changes the value of the A20M bit in control register 72 from an inactive state to an active state (e.g., from logic "1" to logic "0"). Gating logic 68 may be, for example, a two input AND gate receiving signal A20 of the physical address produced by multiplexer 66 at a first input and the A20M bit of control register 72 at the second input. In response to the active logic "0" state of the A20M bit, gating logic 68 produces a "masked" or "cleared" signal A20 at an output. BIU 48 thus returns an address mapping in the context of the new state of the A20M pin of control register 72.

A transition in the voltage level of the received A20M signal from low to high also causes a microinterrupt within microexecution unit 50. During handling of the microinterrupt, microexecution unit 50 samples the high voltage level of the A20M signal and changes the value of the A20M bit in control register 72 from the active state the inactive state (e.g., from logic "0" to logic "1"). Gating logic 68 receives the signal A20 of the physical address produced by multiplexer 66 and the A20M bit of control register 72. In response to the inactive logic "1" state of the A20M bit, gating logic 68 "passes" the signal A20 of the physical address produced by multiplexer 66. Again, BIU 48 returns an address mapping in the context of the new state of the A20M pin of control register 72.

When processor 42 is an x86 processor and the A20M signal is asserted via execution of an "OUT" instruction, handling of the microinterrupt may be deferred until processor 42 completes the instruction following the "OUT" instruction. This allows the "OUT" instruction and the target instruction to be completed before the state of the A20M bit in control register 72 is changed. For clarity, the instruction following the "OUT" instruction will be referred to as the "target" instruction. Such microinterrupt completion deferral may be accomplished by associating one or more "status" bits with instructions executed by processor 42. One of the status bits associated with the target instruction may be used to signal that a deferred microinterrupt must be completed after execution of the target instruction is completed.

Figure 3:
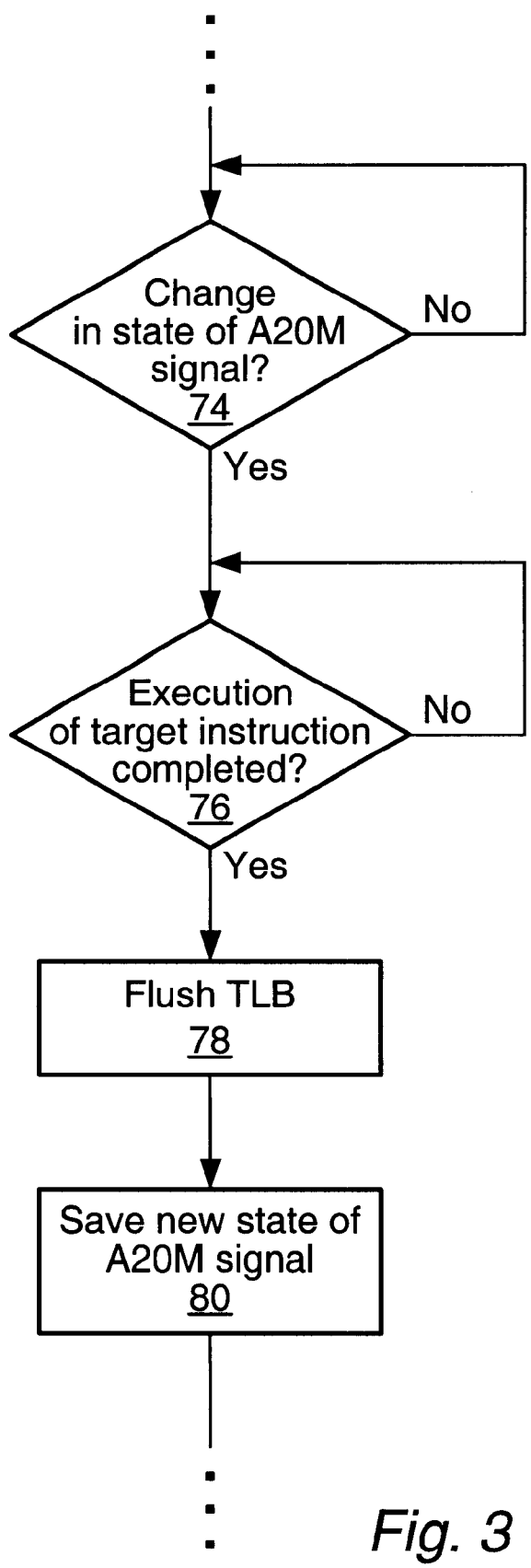
FIG. 3 is a flow chart of a method for configuring address translation hardware within the computer system of FIG. 2 to reflect a change in state of an external A20M address masking signal.

FIG. 3 is a flow chart of a method for configuring address translation hardware to reflect a change in state of the A20M signal. A change in state of the A20M signal is detected in a step 74. This detecting may be efficiently accomplished via an interrupt (e.g., a microinterrupt) as described above. Completion of the execution of the target instruction is determined during a step 76. As described above, the target instruction is a certain number of instructions following the instruction during which the change in state of the A20M signal is detected. As described above, the target instruction may be an instruction following an "OUT" instruction which causes the change in state of the A20M signal. Once execution of the target instruction is completed, the TLB (e.g., TLB 52) is flushed during a step 78. For example, microexecution unit 50 may issue a signal, either to control unit 64 or directly to TLB 52, which causes TLB 52 to be flushed. The new state of the A20M signal is saved during a step 80. Microexecution unit 50 may, for example, sample the new state of the A20M signal as described above and change the value of the A20M bit in control register 72 to reflect the new state of the A20M signal. It is noted that the method of FIG. 3 may be carried out in software or in hardware.

Figure 4:
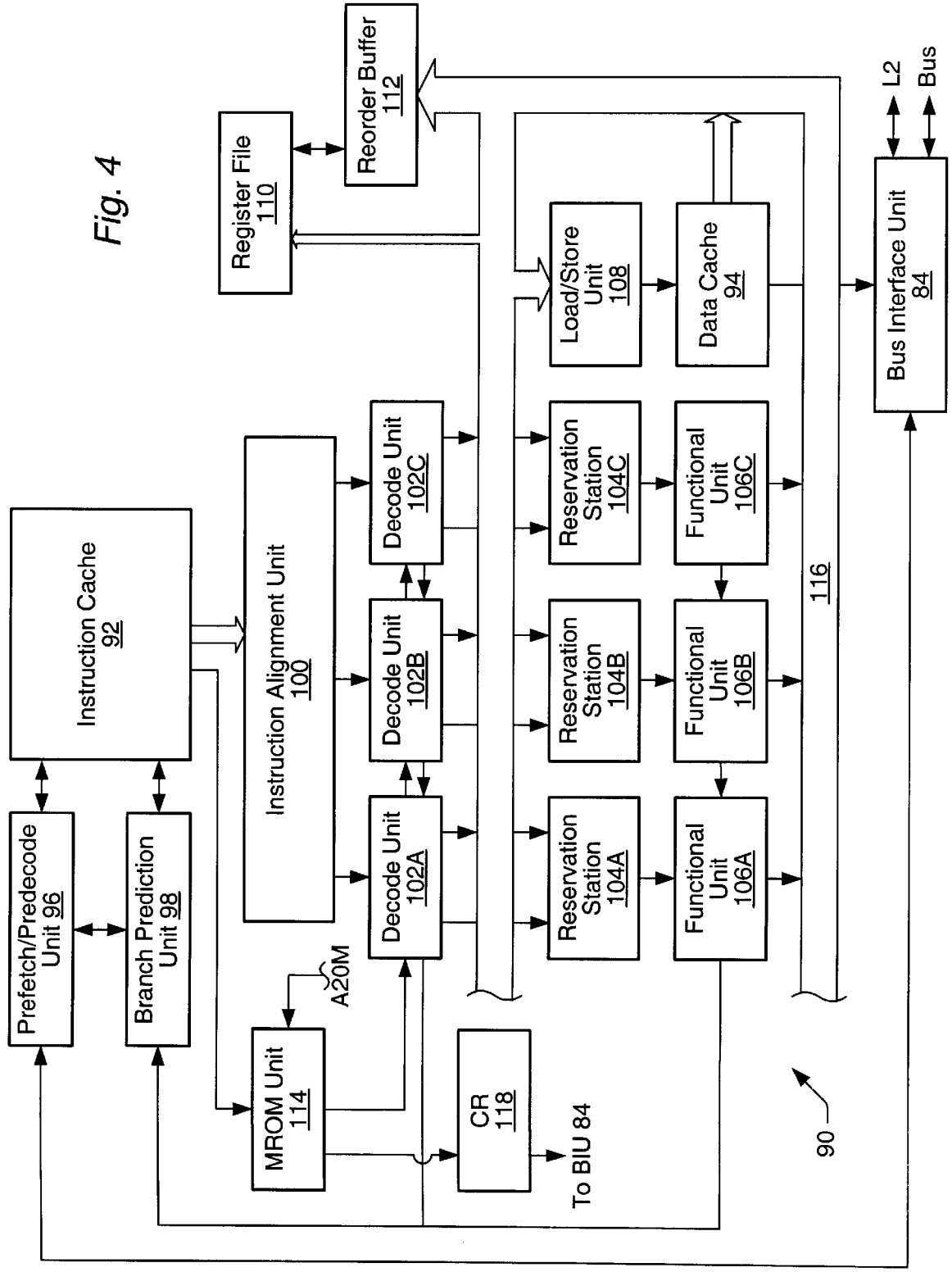
FIG. 4 is a block diagram of one embodiment of a processor incorporating the present address translation mechanism.

FIG. 4 is a block diagram of one embodiment of a processor 90 incorporating the address translation mechanism described above. Processor 90 includes an instruction cache 92 and a data cache 94. Both instruction cache 92 and data cache 94 may be instances of cache unit 46 shown in FIG. 2 and described above. Other embodiments of processor 90 are possible and contemplated. Processor 90 also includes BIU 84, a prefetch/predecode unit 96, a branch prediction unit 98, an instruction alignment unit 100, multiple decode units 102A–102C, reservation stations 104A–104C, functional units 106A–106C, a load/store unit 108, a register file 110, a reorder buffer 112, a microcode read only memory (MROM) unit 114, result buses 116, and a control register (CR) 118. BIU 84 may be an instance of BIU 48, MROM unit 114 may be an instance of microexecution unit 50, and control register 118 may be an instance of control register 72 as shown in FIG. 2 and described above. Elements referred to herein with a particular reference number followed by a letter will be collectively referred to by the reference number alone. For example, decode units 102A–102C will be collectively referred to as decode units 102.

Both instruction cache 92 and data cache 94 may include one or more TLBs (e.g., TLB 52 of FIG. 2). MROM unit 114 may receive the A20M signal generated external to processor 90, and may monitor the state of the A20M signal. Upon detecting a change in state of the A20M signal (e.g., via a microinterrupt), MROM 114 may determine and "tag" a target instruction. Such tagging may be accomplished via status bits associated with the target instruction as described above. Once execution of the target instruction is completed, the one or more TLBs within instruction cache 92 and data cache 94 may be flushed. MROM unit 114 may sample the new state of the A20M signal as described above and change the value of the A20M bit within control register 118 to reflect the new state of the A20M signal. The address translation hardware within BIU 84 may translate linear addresses to physical addresses in accordance with the A20M bit of control register 118, and forward the physical addresses to the one or more TLBs within instruction cache 92 and data cache 94.

Prefetch/predecode unit 96 is coupled to BIU 84, instruction cache 92, and branch prediction unit 98. Branch prediction unit 98 is coupled to instruction cache 92, decode units 102, and functional units 106. Instruction cache 92 is further coupled to MROM unit 114 and instruction alignment unit 100. MROM unit 114 is coupled to decode units 102. Instruction alignment unit 100 is in turn coupled to decode units 102. Each decode unit 102A–102C is coupled to load/store unit 108 and to respective reservation stations 104A–104C. Reservation stations 104A–104C are further coupled to respective functional units 106A–106C. Additionally, decode units 102 and reservation stations 104 are coupled to register file 110 and reorder buffer 112. Functional units 106 are coupled to load/store unit 108, register file 110, and reorder buffer 112. Data cache 94 is coupled to load/store unit 108 and BIU 84. BIU 84 is coupled to a level 2 (L2) cache and a bus. Main memory 44 (see FIG. 2) may be coupled to the bus, and thus to BIU 84 via the bus.

Prefetch/predecode unit 96 prefetches instructions (i.e., fetches instructions before they are needed) from either the L2 cache or main memory 44 via BIU 84, and stores the prefetched instructions within instruction cache 92. Instruction cache 92 is a high speed cache memory for storing a relatively small number of instructions. Instructions stored within instruction cache 92 are fetched by instruction alignment unit 100 and dispatched to decode units 102. In one embodiment, instruction cache 92 is configured to store up to 64 kilobytes of instructions in a two-way set associative structure having multiple lines with 32 bytes in each line, wherein each byte includes 8 bits. Alternatively, any other desired configuration and size may be employed. For example, it is noted that instruction cache 92 may be implemented as a fully associative, set associative, or direct mapped configuration.

Prefetch/predecode unit 96 may employ a variety of prefetch schemes. As prefetch/predecode unit 96 stores prefetched instructions within instruction cache 92, prefetch/predecode unit 96 may generate three predecode bits for each byte of the instructions: a start bit, an end bit, and a functional bit. The predecode bits may form tags indicative of the boundaries of each instruction. The predecode tags may also convey additional information such as whether a given instruction can be decoded directly by decode units 102 or whether the instruction is executed by invoking a microcode procedure controlled by MROM unit 114. Prefetch/predecode unit 96 may be configured to detect branch instructions and to store branch prediction information corresponding to the branch instructions within branch prediction unit 98. Other embodiments may employ any suitable predecode scheme.

Processor 90 may execute instructions from a variable byte length instruction set. A variable byte length instruction set is an instruction set in which different instructions may occupy differing numbers of bytes. An exemplary variable byte length instruction set is the x86 instruction set.

In an exemplary predecode encoding of instructions from a variable byte length instruction set, the start bit for a first byte of an instruction is set, and the end bit for a last byte of the instruction is also set. Instructions which may be directly decoded by decode units 102 will be referred to as "fast path" instructions, and the remaining x86 instructions will be referred to as MROM instructions. For fast path instructions, the functional bit is set for each prefix byte included in the instruction, and is cleared for other bytes. For MROM instructions, the functional bit is cleared for each prefix byte and set for other bytes. Accordingly, if the functional bit corresponding to the end byte is clear, the instruction is a fast path instruction. Conversely, if the functional bit corresponding to the end byte is set, the instruction is an MROM instruction. The opcode of a fast path instruction may thereby be located within an instruction as the byte associated with the first clear functional bit in the instruction. For example, a fast path instruction including two prefix bytes, a Mod R/M byte, and an immediate byte would have start, end, and functional bits as follows:

| Start bits | 10000 |
|---|---|
| End bits | 00001 |
| Functional bits | 11000 |

According to one particular embodiment, early identification of an instruction that includes a scale-index-base (SIB) byte is advantageous for MROM unit 114. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 102. MROM instructions are executed by invoking MROM unit 114. More specifically, when an MROM instruction is encountered, MROM unit 114 parses and issues the instruction into a subset of defined fast path instructions to effectuate the desired operation. MROM unit 114 dispatches the subset of fast path instructions to decode units 102.

Processor 90 employs branch prediction in order to speculatively fetch instructions subsequent to conditional branch instructions. Branch prediction unit 98 is included to perform branch prediction operations. In one embodiment, branch prediction unit 98 employs a branch target buffer which stores up to two branch target addresses and corresponding taken/not taken predictions per 16-byte portion of a cache line in instruction cache 92. The branch target buffer may, for example, comprise 2048 entries or any other suitable number of entries.

Prefetch/predecode unit 96 may determine initial branch targets when a particular line is predecoded. Subsequent updates to the branch targets corresponding to a cache line may occur due to the execution of instructions within the cache line. Instruction cache 92 may provide an indication of the instruction address being fetched, so that branch prediction unit 98 may determine which branch target addresses to select for forming a branch prediction. Decode units 102 and functional units 106 may provide update information to branch prediction unit 98. Decode units 102 may detect branch instructions which were not predicted by branch prediction unit 98. Functional units 106 may execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction.

When a mispredicted branch instruction is detected, instructions subsequent to the mispredicted branch may be discarded from the various units of processor 90. In an alternative configuration, branch prediction unit 98 may be coupled to reorder buffer 112 instead of decode units 102 and functional units 106, and may receive branch misprediction information from reorder buffer 112. A variety of suitable branch prediction algorithms may be employed by branch prediction unit 98.

As instruction alignment unit 100 fetches instructions cache 92, the corresponding predecode data may be scanned to provide information to instruction alignment unit 100 (and to MROM unit 114) regarding the instructions being fetched. Instruction alignment unit 100 may utilize the scanning data to align an instruction to each of decode units 102. In one embodiment, instruction alignment unit 100 may align instructions from three sets of eight instruction bytes to decode units 102. Decode unit 102A may receive an instruction which is prior to instructions concurrently received by decode units 102B and 102C (in program order). Similarly, decode unit 102B may receive an instruction which is prior to the instruction concurrently received by decode unit 102C in program order.

Decode units 102 are configured to decode instructions received from instruction alignment unit 100. Register operand information may be detected and routed to register file 110 and reorder buffer 112. Additionally, if the instructions require one or more memory operations to be performed, decode units 102 may dispatch the memory operations to load/store unit 108. Each instruction is decoded into a set of "control values" for functional units 106, and these control values are dispatched to reservation stations 104. Operand address information and displacement or immediate data which may be included with the instruction may be forwarded to reservation stations 104 along with the control values. In one particular embodiment, each instruction is decoded into a maximum of two operations which may be separately executed by functional units 106A–106C.

Processor 90 supports out of order instruction execution. Reorder buffer 112 is used to keep track of the original program sequence for register read and write operations, to implement register renaming, to allow for speculative instruction execution and branch misprediction recovery, and to facilitate precise exceptions. A temporary storage location within reorder buffer 112 may be reserved upon decode of an instruction that involves the update of a register to thereby store speculative register states. If a branch prediction is incorrect, the results of speculatively-executed instructions along the mispredicted path may be invalidated in the buffer before they are written to register file 110. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 112.

The instruction control values and immediate or displacement data provided at the outputs of decode units 102 may be routed directly to respective reservation stations 104. In one embodiment, each reservation station 104 is capable of holding instruction information (i.e., instruction control values as well as operand values, operand tags and/or immediate data) for up to five pending instructions awaiting issue to the corresponding functional unit. In the embodiment of FIG. 4, each reservation station 104 is associated with a dedicated functional unit 106. Accordingly, three dedicated "issue positions" are formed by reservation stations 104 and functional units 106. In other words, issue position 0 is formed by reservation station 104A and functional unit 106A. Instructions aligned and dispatched to reservation station 104A are executed by functional unit 106A. Similarly, issue position 1 is formed by reservation station 1 04B and functional unit 106B; and issue position 2 is formed by reservation station 104C and functional unit 106C.

Upon decode of a particular instruction, if a required operand is a register location, register address information is routed to reorder buffer 112 and register file 110 simultaneously. It is well known that the x86 register file includes eight 32-bit real registers (i.e., typically referred to as EAX, EBX, ECX, EDX, EBP, ESI, EDI and ESP). In embodiments of processor 90 which employ the x86 processor architecture, register file 110 may comprise storage locations for each of the 32-bit real registers. Additional storage locations may be included within register file 110 for use by MROM unit 114.

Reorder buffer 112 may contain temporary storage locations for results which change the contents of the real registers to thereby allow out of order instruction execution. A temporary storage location of reorder buffer 112 may be reserved for each instruction which, upon decode, is determined to modify the contents of one of the real registers. Therefore, at various points during execution of a particular program, reorder buffer 112 may have one or more locations which contain the speculatively executed contents of a given register.

If, following decode of a given instruction, it is determined that reorder buffer 112 has a previous location or locations assigned to a register used as an operand in the given instruction, reorder buffer 112 may forward to the corresponding reservation station either: 1) the value in the most recently assigned location, or 2) a tag for the most recently assigned location if the value has not yet been produced by the functional unit that will eventually execute the previous instruction. If reorder buffer 112 has a location reserved for a given register, the operand value (or reorder buffer tag) may be provided from reorder buffer 112 rather than from register file 110. If there is no location reserved for a required register in reorder buffer 112, the value may be taken directly from register file 110. If the operand corresponds to a memory location, the operand value may be provided to the reservation station through load/store unit 108.

In one particular embodiment, reorder buffer 112 is configured to store and manipulate concurrently decoded instructions as a unit. This configuration will be referred to herein as "line-oriented". By manipulating several instructions together, the hardware employed within reorder buffer 112 may be simplified. For example, a line-oriented reorder buffer may be included in the present embodiment which allocates storage sufficient for instruction information pertaining to three instructions (one from each decode unit 102) whenever one or more instructions are dispatched by decode units 102. By contrast, a variable amount of storage may be allocated in conventional reorder buffers, dependent upon the number of instructions actually dispatched. A comparatively larger number of logic gates may be required to allocate the variable amount of storage.

When each of the concurrently decoded instructions has executed, the instruction results may be stored into register file 110 simultaneously. The storage is then free for allocation to another set of concurrently decoded instructions. Additionally, the amount of control logic circuitry employed per instruction may be reduced as the control logic is amortized over several concurrently decoded instructions. A reorder buffer tag identifying a particular instruction may be divided into two fields: a line tag and an offset tag. The line tag may identify the set of concurrently decoded instructions including the particular instruction, and the offset tag may identify which instruction within the set corresponds to the particular instruction. Storing instruction results into register file 110 and freeing the corresponding storage is referred to as "retiring" the instructions. It is noted that any reorder buffer configuration may be employed in various embodiments of processor 90.

As described above, reservation stations 104 store instructions until the instructions are executed by the corresponding functional unit 106. An instruction may be selected for execution if: (i) the operands of the instruction have been provided; and (ii) the operands have not yet been provided for instructions which are within the same reservation station 104A–104C and which are prior to the instruction in program order. It is noted that when an instruction is executed by one of the functional units 106, the result of that instruction may be passed directly to any reservation stations 104 that are waiting for that result at the same time the result is passed to update reorder buffer 112 (this technique is commonly referred to as "result forwarding"). An instruction may be selected for execution and passed to a functional unit 106A–106C during the clock cycle that the associated result is forwarded. Reservation stations 104 may route the forwarded result to the functional unit 106 in this case. In embodiments in which instructions may be decoded into multiple operations to be executed by functional units 106, the operations may be scheduled separately.

In one embodiment, each of the functional units 106 is configured to perform integer arithmetic operations of addition and subtraction, as well as shifts, rotates, logical operations, and branch operations. The operations are performed in response to the control values decoded for a particular instruction by decode units 102. It is noted that a floating point unit (not shown) may also be employed to accommodate floating point operations. The floating point unit may be operated as a coprocessor, receiving instructions from MROM unit 114 or reorder buffer 112 and subsequently communicating with reorder buffer 112 to complete the instructions. Additionally, functional units 106 may be configured to perform address generation for load and store memory operations performed by load/store unit 108. In one particular embodiment, each functional unit 106 may comprise an address generation unit for generating addresses and an execute unit for performing the remaining functions. The two units may operate independently upon different instructions or operations during a clock cycle.

Each of the functional units 106 may also provide information regarding the execution of conditional branch instructions to the branch prediction unit 98. If a branch prediction was incorrect, branch prediction unit 98 may flush instructions subsequent to the mispredicted branch that have entered the instruction processing pipeline, and initiate the fetching of required instructions from instruction cache 92 or main memory. It is noted that in such situations, results of instructions in the original program sequence which occur after the mispredicted branch instruction may be discarded, including those which were speculatively executed and temporarily stored in load/store unit 108 and reorder buffer 112. It is further noted that branch execution results may be provided by functional units 106 to reorder buffer 112, which may indicate branch mispredictions to functional units 106.

Results produced by functional units 106 may be sent to reorder buffer 112 if a register value is being updated, and to load/store unit 108 if the contents of a memory location are changed. If the result is to be stored in a register, reorder buffer 112 may store the result in the location reserved for the value of the register when the instruction was decoded. Multiple result buses 116 are included for forwarding of results from functional units 106 and load/store unit 108. Result buses 116 convey the result generated, as well as the reorder buffer tag identifying the instruction being executed.

Load/store unit 108 provides an interface between functional units 106 and data cache 94. In one embodiment, load/store unit 108 is configured with a first load/store buffer having storage locations for data and address information for pending loads or stores which have not accessed data cache 94 and a second load/store buffer having storage locations for data and address information for loads and stores which have access data cache 94. For example, the first buffer may comprise 12 locations and the second buffer may comprise 32 locations. Decode units 102 may arbitrate for access to load/store unit 108. When the first buffer is full, a decode unit may wait until load/store unit 108 has room for the pending load or store request information.

Load/store unit 108 may also perform dependency checking for load memory operations against pending store memory operations to ensure that data coherency is maintained. A memory operation is a transfer of data between processor 90 and the L2 cache or main memory 44 via BIU 84. Memory operations may be the result of an instruction which utilizes an operand stored in memory, or may be the result of a load/store instruction which causes the data transfer but no other operation. Additionally, load/store unit 108 may include a special register storage for special registers such as the segment registers and other registers related to the address translation mechanism defined by the x86 processor architecture.

Data cache 94 is a high speed cache memory provided to temporarily store data being transferred between load/store unit 108 and the L2 cache or main memory 44. In one embodiment, data cache 94 has a capacity of storing up to 64 kilobytes of data in an two-way set associative structure. It is understood that data cache 94 may be implemented in a variety of specific memory configurations, including a set associative configuration, a fully associative configuration, a direct-mapped configuration, and any suitable size of any other configuration.

Instruction cache 92 may be an embodiment of cache unit 70 shown in FIG. 4 and described above for storing instructions, and data cache 94 may be an embodiment of cache unit 70 for storing data. In embodiments of processor 90 employing the x86 processor architecture, instruction cache 92 and data cache 94 may be linearly addressed and physically tagged. A linear address is a virtual address as described above, and may be provided to instruction cache 92 or data cache 94. TLB 10 within instruction cache 92 and data cache 94 may be used to store a relatively small number of virtual-to-physical address translations as described above. TLB 10 may provide the physical address corresponding to the linear address to a physically-tagged cache memory (e.g., cache memory 72) within instruction cache 92 or data cache 94. Instruction cache 92 and data cache 94 may translate linear addresses to physical addresses for accessing either the L2 cache or main memory 44 via BIU 84.

BIU 84 is coupled to the bus, and is configured to communicate between processor 90 and other components also coupled to the bus via the bus. For example, the bus may be compatible with the EV-6 bus developed by Digital Equipment Corporation. Alternatively, any suitable interconnect structure may be used including packet-based, unidirectional or bi-directional links, etc. An optional L2 cache interface may be included within BIU 84 for interfacing to the L2 cache.

Figure 5:
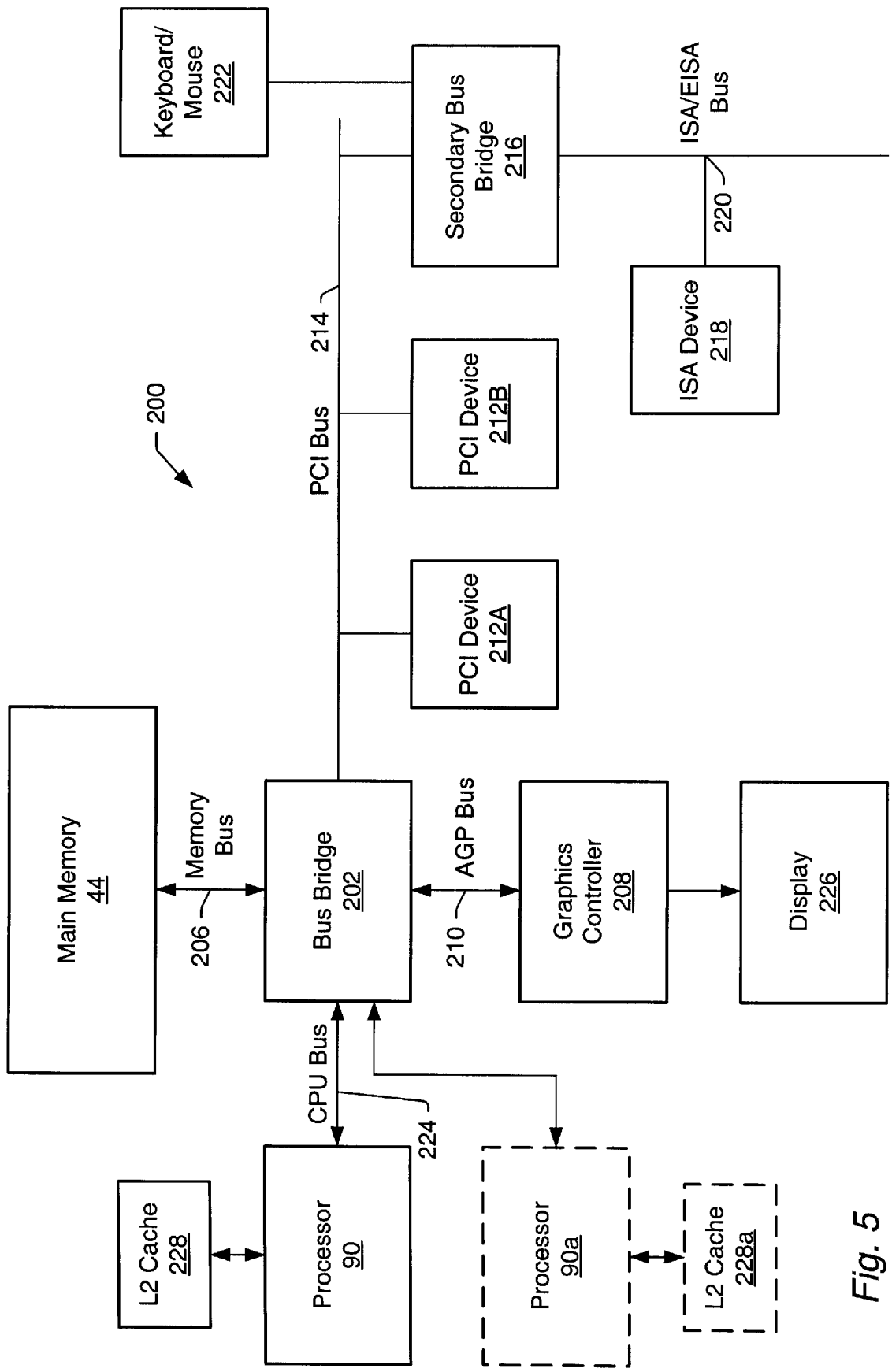
FIG. 5 is a block diagram of one embodiment of a computer system including the processor of FIG. 4.

FIG. 5 is a block diagram of one embodiment of a computer system 200 including processor 90 of FIG. 4. Processor 90 is coupled to a variety of system components through a bus bridge 202. Other embodiments of computer system 200 are possible and contemplated.

In the embodiment of FIG. 5, main memory 44 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a peripheral component interconnect (PCI) bus 214. A secondary bus bridge 216 may further be provided to accommodate an electrical interface to one or more EISA or ISA devices 218 through an extended industry standard architecture (EISA)/industry standard architecture (ISA) bus 220. Processor 90 is coupled to bus bridge 202 through a CPU bus 224 and to an optional L2 cache 228.

Bus bridge 202 provides an interface between processor 90, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 90 and bus bridge 202 in other embodiments. Alternatively, the external cache may be coupled to bus bridge 202 and cache control logic for the external cache may be integrated into bus bridge 202. L2 cache 228 is further shown in a backside configuration to processor 90. It is noted that L2 cache 228 may be separate from processor 90, integrated into a cartridge (e.g. slot 1 or slot A) with processor 90, or even integrated onto a semiconductor substrate with processor 90.

Main memory 44 is used to store software instructions and data as described above. A suitable main memory 44 comprises dynamic random access memory (DRAM). For example, a plurality of banks of synchronous DRAM (SDRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, small computer systems interface (SCSI) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the PCI, AGP, and EISA/ISA buses have been used as examples in the above description, any bus architectures may be substituted as desired. It is further noted that computer system 200 may be a multiprocessing computer system including additional processors (e.g. processor 90a shown as an optional component of computer system 200). Processor 90a may be similar to processor 90, or processor 90a may be an identical copy of processor 90. Processor 90a may be connected to bus bridge 202 via an independent bus (as shown in FIG. 5) or may share CPU bus 224 with processor 90. Furthermore, processor 90a may be coupled to an optional L2 cache 228a similar to L2 cache 228.

It is noted that while certain embodiments have been described above as employing the x86 instruction set, any other instruction set architecture which employs virtual-to-physical address translation may employ the above described features.

Numerous variations and modifications will become apparent to those skilled in the art once the above disclosure is fully appreciated. It is intended that the following claims be interpreted to embrace all such variations and modifications.

What is claimed is:

1. A processor, comprising:
   a cache unit for storing data items, wherein said cache unit is coupled to receive a linear address and comprises a translation lookaside buffer (TLB) for storing a plurality of linear addresses and corresponding physical addresses, and wherein said cache unit is configured to provide said linear address when a physical address corresponding to said linear address is not found within said TLB;
   a bus interface unit coupled to receive said linear address from said cache unit and configured to provide a physical address corresponding to said linear address to said cache unit;
   wherein said linear address comprises a first plurality of address signals, and wherein the bus interface unit comprises:
   address translation circuitry coupled to receive said first plurality of address signals, and wherein said address translation circuitry is configured to produce a second plurality of address signals from said first plurality of address signals;
   a multiplexer coupled to receive said first and second plurality of address signals and a paging signal, wherein said multiplexer is configured to produce a third plurality of address signals, and wherein said third plurality of address signals is either said first plurality of address signals or said second plurality of address signals dependent upon said paging signal; and gating logic coupled to receive at least one of said third plurality of address signals and a first masking signal, and wherein said gating logic is configured to either pass the at least one of said third plurality of address signals or to mask the at least one of said third plurality of address signals dependent upon said first masking signal; and wherein said bus interface unit provides the third plurality of address signals acted upon by said gating logic to said cache unit as the physical address corresponding to said linear address.

2. The processor as recited in claim 1, further comprising a control register including a masking bit and a paging bit, wherein said first masking signal is a value of said masking bit, and wherein said paging signal is a value of said paging bit.

3. The processor as recited in claim 2, further comprising a microexecution unit coupled to receive a second masking signal generated external to said processor, wherein said microexecution unit is configured to: (i) flush the contents of said TLB dependent upon said second masking signal, and (ii) modify the value of said masking bit within said control register dependent upon said second masking signal.

4. The processor as recited in claim 1, wherein said bus interface unit is coupled to receive said paging signal, and wherein said paging signal is asserted when a paged addressing mode is enabled, and wherein said address translation circuitry is configured to produce said second plurality of address signals from said first plurality of address signals when said paging signal is asserted.

5. The processor as recited in claim 1, wherein said first plurality of address signals comprise a virtual address when said paging signal is asserted, and wherein said second plurality of address signals comprise a physical address when said paging signal is asserted such that said address translation circuitry performs a virtual-to-physical address translation when said paging signal is asserted.

6. The processor as recited in claim 1, wherein said gating logic produces the at least one of said third plurality of address signals when said gating logic passes the at least one of said third plurality of address signals.

7. The processor as recited in claim 1, wherein said gating logic produces logic "0" signals as the at least one of said third plurality of address signals when said gating logic masks the at least one of said third plurality of address signals.

8. The processor as recited in claim 1, wherein said bus interface unit is coupled to a main memory, and wherein said main memory is used to store virtual memory system information, and wherein said address translation circuitry uses said virtual memory system information to produce said second plurality of address signals.

9. The processor as recited in claim 7, wherein said virtual memory system information comprises a page directory and a page table.

10. A method for performing address translation, comprising:

providing a translation lookaside buffer (TLB) for storing a plurality of linear addresses and corresponding physical addresses;

performing the following upon detecting a change in state of a masking signal from an old state to a new state:

flushing the TLB; and
saving the new state of the masking signal;

producing a physical address from a linear address when said linear address is not found within said TLB, wherein said physical address comprises a plurality of physical address signals;

masking at least one of said physical address signals dependent upon the saved state of the masking signal; and storing said linear address and said physical address within said TLB.

11. A processor comprising:

a control register configured to store a paging indication indicative of whether or not virtual to physical address translation is enabled; and a translation lookaside buffer (TLB) coupled to receive a first address, wherein the TLB is configured to map the first address to a second address stored in the TLB responsive to the first address hitting in the TLB, the TLB outputting the second address and a hit indication indicative of whether or not the first address hits in the TLB;

wherein the TLB is configured to detect the hit independent of whether or not virtual to physical address translation is enabled, and wherein the TLB is configured to map the first address to the second address independent of whether or not virtual to physical address translation is enabled.

12. The processor as recited in claim 11 wherein, if the first address is a miss in the TLB, the processor passes the first address to circuitry configured to map the first address to the second address, wherein the circuitry is configured to selectively mask at least one bit of the second address prior to storage in the TLB, the selective mask performed in response to a masking signal.

13. The processor as recited in claim 12 wherein, if the masking signal is in a first state, the at least one bit is masked to a zero value.

14. The processor as recited in claim 13 wherein, if the masking signal is in a second state, the at least one bit is passed through unchanged.

15. The processor as recited in claim 12 wherein the masking signal is sourced by the control register.

16. The processor as recited in claim 15 wherein the processor is configured to determine the masking signal from a second masking signal input to the processor, and wherein the processor, in response to detecting a change in the second masking signal, is configured to generate an exception on an instruction to update the control register.

17. The processor as recited in claim 12 wherein the circuitry is coupled to the control register, and wherein, in response to virtual to physical address translation not being enabled, the circuitry is configured to map the first address to a second address which equals the first address prior to the selective masking.

18. The processor as recited in claim 17 wherein, if the masking signal indicates that masking is to be performed, the second address equals the first address except in the at least one bit, which is masked to zero.

19. The processor as recited in claim 17 wherein, in response to virtual to physical address translation being enabled, the circuitry is configured to map the first address to the second address using translation tables stored in a main memory to which the processor has access.

20. The processor as recited in claim 11 further comprising cache hit circuitry configured to determining if the first address is a hit in a cache, the cache hit circuitry coupled to receive the second address and the hit indication from the TLB, wherein the cache hit circuitry is configured to detect a hit in the cache by comparing the second address to tags from the cache responsive to the hit indication from the TLB indicating a hit and independent of whether or not virtual to physical address translation is enabled.

21. A method comprising:

detecting that a first address is a hit in a TLB, wherein the detecting is independent of whether or not virtual to physical address translation is enabled; and mapping the first address to a second address stored in the TLB responsive to detecting that the first address is a hit in the TLB, wherein the mapping is independent of whether or not virtual to physical address translation is enabled.

22. The method as recited in claim 21 further comprising:

detecting that a third ad dress is a miss in the TLB;

mapping the third address to a fourth address; and selectively masking at least one bit in the fourth address prior to storing the fourth address in the TLB responsive to a masking signal.

23. The method as recited in claim 22 wherein the selectively masking comprises:

passing the at least one bit of the fourth address unchanged in response to the masking signal having a first state; and masking the at least one bit of the fourth address to zero in response to the masking signal having a second state.

24. The method as recited in claim 21 further comprising detecting a cache hit in response to comparing the second address to one or more cache tags and independent of whether or not virtual to physical address translation is enabled.

* * * * *

UNITED STATES PATENT AND TRADEMARK OFFICE
CERTIFICATE OF CORRECTION

PATENT NO.     : 6,446,189 B1                                    Page 1 of 1
DATED          : September 3, 2002
INVENTOR(S)    : Gerald D. Zuraski, Jr. et al.

It is certified that error appears in the above-identified patent and that said Letters Patent is hereby corrected as shown below:

Column 22,
Line 2, please delete "ad dress" and insert -- address -- therein.

Signed and Sealed this

Eleventh Day of February, 2003

JAMES E. ROGAN
*Director of the United States Patent and Trademark Office*